United States Patent
Yuan et al.

(10) Patent No.: US 9,100,223 B2
(45) Date of Patent: Aug. 4, 2015

(54) SELECTING FORMAT FOR CONTENT DISTRIBUTION

(75) Inventors: Jian Yuan, Mountain View, CA (US); Oren E. Zamir, Los Altos, CA (US)

(73) Assignee: Google Inc., Mountain View, CA (US)

(*) Notice: Subject to any disclaimer, the term of this patent is extended or adjusted under 35 U.S.C. 154(b) by 313 days.

(21) Appl. No.: 12/402,040

(22) Filed: Mar. 11, 2009

(65) Prior Publication Data

US 2010/0138553 A1    Jun. 3, 2010

Related U.S. Application Data

(60) Provisional application No. 61/118,950, filed on Dec. 1, 2008.

(51) Int. Cl.
*G06F 15/16* (2006.01)
*H04L 12/66* (2006.01)
*G06Q 30/02* (2012.01)

(52) U.S. Cl.
CPC .............. *H04L 12/66* (2013.01); *G06Q 30/02* (2013.01); *G06Q 30/0207* (2013.01);
(Continued)

(58) Field of Classification Search
USPC ......... 709/224, 230, 201, 202, 203, 208, 217, 709/218, 219, 220, 221, 222, 223, 225, 226, 709/227, 228, 229, 238, 240, 241, 243, 244, 709/245, 246, 248; 715/764, 200, 201, 204, 715/205, 206, 207, 208, 209, 221, 222, 223, 715/224, 225, 226, 227, 234, 235, 236, 237, 715/238, 239, 240, 243, 244, 245, 246, 248, 715/249, 250, 251, 252, 253, 273, 274, 275, 715/276, 277; 370/464, 465, 466, 470, 476; 705/14.39, 14.46, 14.66, 30, 35; 706/52; 707/999.005, 706, 751, 767, 707/E17.014
See application file for complete search history.

(56) References Cited

U.S. PATENT DOCUMENTS 5,918,014 A     6/1999  Robinson
6,108,637 A *   8/2000  Blumenau ........................ 705/7
(Continued)

FOREIGN PATENT DOCUMENTS

JP     2001-195296      7/2001
KR  10-2007-0061149     6/2007
(Continued)

OTHER PUBLICATIONS

'VEOH Launches new behavioral targeting solution for online video Ads and branded content' [online]. VEOH Press Release, [retrieved on Jun. 1, 2009], [published on Jul. 14, 2008]. Retrieved from the Internet: http://www.ceoh.com/static/corporate/press_releases/07_14_2008.html.
(Continued)

*Primary Examiner* — Saket K Daftuar
(74) *Attorney, Agent, or Firm* — Fish & Richardson P.C.

(57) ABSTRACT

Among other disclosed subject matter, a computer-implemented method for performing a content distribution associated with a format includes performing analysis of an information collection reflecting network activities by a user, the network activities occurring in response to earlier content distributions to the user. The method includes selecting a format for a content distribution to be made to the user, the format being selected based on the analysis. The method includes performing the content distribution to the user using the selected format.

19 Claims, 4 Drawing Sheets

(52) U.S. Cl.
CPC ....... *G06Q 30/0242* (2013.01); *G06Q 30/0246* (2013.01); *G06Q 30/0247* (2013.01); *G06Q 30/0254* (2013.01); *G06Q 30/0272* (2013.01); *G06Q 30/0277* (2013.01); *G06Q 30/0282* (2013.01)

(56) References Cited

U.S. PATENT DOCUMENTS

| | | | |
|---|---|---|---|
| 6,360,261 B1* | 3/2002 | Boyd et al. | 709/224 |
| 6,748,555 B1 | 6/2004 | Teegan et al. | |
| 6,756,997 B1* | 6/2004 | Ward et al. | 715/716 |
| 6,904,460 B1* | 6/2005 | Raciborski et al. | 709/224 |
| 7,100,111 B2* | 8/2006 | McElfresh et al. | 715/207 |
| 7,213,005 B2* | 5/2007 | Mourad et | 705/64 |
| 7,373,394 B1* | 5/2008 | Li et al. | 709/219 |
| 7,386,473 B2* | 6/2008 | Blumenau | 705/26 |
| 7,502,836 B1* | 3/2009 | Menditto et al. | 709/217 |
| 7,555,532 B2* | 6/2009 | Decasper et al. | 709/217 |
| 7,565,445 B2* | 7/2009 | Xie | 709/238 |
| 7,594,035 B2* | 9/2009 | Grin et al. | 709/246 |
| 7,644,098 B2* | 1/2010 | Patel et al. | 707/999.101 |
| 7,650,617 B2* | 1/2010 | Hoshino et al. | 725/34 |
| 7,653,751 B2* | 1/2010 | Grin et al. | 709/246 |
| 7,822,871 B2* | 10/2010 | Stolorz et al. | 709/238 |
| 7,849,080 B2* | 12/2010 | Chang et al. | 707/723 |
| 7,921,107 B2* | 4/2011 | Chang et al. | 707/723 |
| 2002/0091652 A1 | 7/2002 | Nagahara | 705/400 |
| 2002/0152305 A1* | 10/2002 | Jackson et al. | 709/224 |
| 2002/0184097 A1* | 12/2002 | Hijiri et al. | 705/14 |
| 2003/0046161 A1* | 3/2003 | Kamangar et al. | 705/14 |
| 2003/0083937 A1* | 5/2003 | Hasegawa et al. | 705/14 |
| 2003/0149581 A1* | 8/2003 | Chaudhri et al. | 705/1 |
| 2003/0163372 A1* | 8/2003 | Kolsy | 705/14 |
| 2003/0177490 A1* | 9/2003 | Hoshino et al. | 725/34 |
| 2003/0217328 A1* | 11/2003 | Agassi et al. | 715/500 |
| 2004/0054577 A1* | 3/2004 | Inoue et al. | 705/14 |
| 2004/0054589 A1* | 3/2004 | Nicholas et al. | 705/14 |
| 2004/0236594 A1* | 11/2004 | Fisher et al. | 705/1 |
| 2005/0043060 A1* | 2/2005 | Brandenberg et al. | 455/558 |
| 2005/0071224 A1* | 3/2005 | Fikes et al. | 705/14 |
| 2005/0097204 A1* | 5/2005 | Horowitz et al. | 709/223 |
| 2005/0187818 A1* | 8/2005 | Zito et al. | 705/14 |
| 2005/0193335 A1* | 9/2005 | Dorai et al. | 715/530 |
| 2005/0222900 A1* | 10/2005 | Fuloria et al. | 705/14 |
| 2006/0036728 A1* | 2/2006 | Xie | 709/224 |
| 2006/0089912 A1* | 4/2006 | Spagna et al. | 705/51 |
| 2006/0129458 A1* | 6/2006 | Maggio | 705/14 |
| 2006/0174209 A1* | 8/2006 | Barros | 715/764 |
| 2006/0200761 A1 | 9/2006 | Judd et al. | |
| 2006/0212350 A1* | 9/2006 | Ellis et al. | 705/14 |
| 2006/0253323 A1* | 11/2006 | Phan et al. | 705/14 |
| 2006/0287916 A1* | 12/2006 | Starr et al. | 705/14 |
| 2006/0294538 A1* | 12/2006 | Li et al. | 725/24 |
| 2007/0055566 A1* | 3/2007 | Gaughan et al. | 705/14 |
| 2007/0061363 A1* | 3/2007 | Ramer et al. | 707/104.1 |
| 2007/0088801 A1* | 4/2007 | Levkovitz et al. | 709/217 |
| 2007/0088851 A1* | 4/2007 | Levkovitz et al. | 709/246 |
| 2007/0088852 A1* | 4/2007 | Levkovitz | 709/246 |
| 2007/0174624 A1* | 7/2007 | Wolosewicz et al. | 713/176 |
| 2007/0225996 A1* | 9/2007 | Haberman et al. | 705/1 |
| 2007/0225997 A1* | 9/2007 | Haberman et al. | 705/1 |
| 2008/0115170 A1* | 5/2008 | Ray et al. | 725/58 |
| 2008/0155470 A1* | 6/2008 | Khedouri et al. | 715/810 |
| 2008/0155588 A1* | 6/2008 | Roberts et al. | 725/34 |
| 2008/0207182 A1* | 8/2008 | Maharajh et al. | 455/414.1 |
| 2008/0244067 A1* | 10/2008 | Ushiyama | 709/224 |
| 2008/0249853 A1* | 10/2008 | Dekel et al. | 705/14 |
| 2008/0249961 A1* | 10/2008 | Harkness et al. | 705/400 |
| 2008/0255937 A1* | 10/2008 | Chang et al. | 705/14 |
| 2008/0256056 A1* | 10/2008 | Chang et al. | 707/5 |
| 2008/0256059 A1* | 10/2008 | Chang et al. | 707/5 |
| 2008/0256060 A1* | 10/2008 | Chang et al. | 707/5 |
| 2008/0256061 A1* | 10/2008 | Chang et al. | 707/5 |
| 2008/0319836 A1* | 12/2008 | Aaltonen et al. | 705/10 |
| 2009/0083779 A1* | 3/2009 | Shteyn et al. | 725/14 |
| 2009/0099931 A1* | 4/2009 | Aaltonen et al. | 705/14 |
| 2009/0106096 A1* | 4/2009 | Horowitz | 705/14 |
| 2009/0132373 A1* | 5/2009 | Redlich | 705/14 |
| 2009/0150210 A1* | 6/2009 | Athsani et al. | 705/10 |
| 2009/0157450 A1* | 6/2009 | Athsani et al. | 705/7 |
| 2009/0164949 A1* | 6/2009 | Henkin et al. | 715/862 |
| 2009/0177381 A1* | 7/2009 | Taniguchi et al. | 701/208 |
| 2009/0177525 A1* | 7/2009 | Aaltonen et al. | 705/10 |
| 2009/0177542 A1* | 7/2009 | Haberman et al. | 705/14 |
| 2009/0181641 A1* | 7/2009 | Fiatal | 455/406 |
| 2009/0187575 A1* | 7/2009 | DaCosta | 707/10 |
| 2009/0204475 A1* | 8/2009 | Cohen et al. | 705/10 |
| 2009/0235364 A1* | 9/2009 | Cohen et al. | 726/28 |
| 2010/0082412 A1* | 4/2010 | Brower et al. | 705/14.4 |
| 2010/0094860 A1* | 4/2010 | Lin et al. | 707/709 |
| 2010/0145808 A1* | 6/2010 | Hilbert et al. | 705/14.66 |
| 2010/0174595 A1* | 7/2010 | Aaltonen et al. | 705/14.23 |
| 2010/0222046 A1* | 9/2010 | Cumming | 455/418 |
| 2010/0268805 A1* | 10/2010 | Jeong et al. | 709/223 |
| 2011/0015992 A1* | 1/2011 | Liffiton et al. | 705/14.46 |

FOREIGN PATENT DOCUMENTS

| | | |
|---|---|---|
| KR | 10-2007-0083263 | 8/2007 |
| KR | 10-2008-0079708 | 9/2008 |
| WO | WOA03/090085 | 10/2003 |

OTHER PUBLICATIONS

'Products-Dart for Advertisers' [online]. Double Click, [retrieved on May 11, 2009], [published on Oct. 22, 2007]. Retrieved from the Internet: http://web.archive.org/web/20071022204103/http://www.doubleclick.com/products/dfa/in 'Audience Management System' [brochure]. Tacoda 2003, 2 pages.

'Behavioral Targeting—The Good, the Bad and the Ugly', [presentation], BlueLithium 2007, pp. 1-20.

Examiner Lars Eichenauer, EPO, EPO Patent Application No. 05014212.4, Communication, dated Oct. 16, 2008, pp. 1-5.

Korean Examiner Mr Mi Jong Park, International Search Report and Written Opinion for Application No. PCT/US2009/065933, dated Jun. 22, 2010, 11 pages.

* cited by examiner

SELECTING FORMAT FOR CONTENT DISTRIBUTION

CROSS-REFERENCE TO RELATED APPLICATIONS

This application claims priority to U.S. Provisional Application Ser. No. 61/118,950, filed on Dec. 1, 2008, the entire contents of which are incorporated herein by reference.

TECHNICAL FIELD

This document relates to information processing.

BACKGROUND

Content is distributed in computer systems or by other technologies in different situations. For example, advertisements can be used in an attempt to inform people about a wide variety of products, goods, and services. Generally, advertisers may seek to target the content of their advertising to the intended audience or viewers.

Advertisements can take many forms, such as printed material, commercials on television and radio, billboards, and online advertising. These advertisements can be placed without detailed knowledge about the potential viewers with the intention of reaching potential customers who encounter the advertisement coincidentally. In some cases, advertisements are placed to target a particular demographic group (e.g., ads for toys in a children's' TV show or billboards for tires along a roadside) in order to increase the chances of reaching potential customers.

SUMMARY

The invention relates to selecting a format.

In a first aspect, a computer-implemented method for performing a content distribution associated with a format includes performing analysis of an information collection reflecting network activities by a user, the network activities occurring in response to earlier content distributions to the user. The method includes selecting a format for a content distribution to be made to the user, the format being selected based on the analysis. The method includes performing the content distribution to the user using the selected format.

Implementations can include any, all or none of the following features. Performing the analysis can include determining a first number of content portions that have been presented in the earlier content distributions; determining a second number of events included in the network activities where the user has selected at least one of the content portions; and comparing the first number with the second number. Performing the analysis can include identifying any of the earlier content distributions that had a certain format characteristic, wherein the format is selected based on the analysis of how frequently the network activities occurred regarding the earlier content distributions that had the format characteristic. Performing the analysis further can include determining a frequency with which the network activities occurred regarding content portions having the format characteristic of being associated with a specific color. Performing the analysis can further include determining a frequency with which the network activities occurred regarding content portions having the format characteristic of being associated with a specific size. Performing the analysis can further include determining a frequency with which the network activities occurred regarding content portions having the format characteristic of being associated with a specific layout. Performing the analysis can further include determining a frequency with which the network activities occurred regarding content portions having the format characteristic of being associated with a specific shape. Performing the analysis can further include determining a frequency with which the network activities occurred regarding content portions having the format characteristic of being associated with a specific placement on a user interface visible to the user. Performing the analysis can include identifying any of the earlier content distributions that was formulated in a certain language, wherein a language for the content distribution is selected based on the analysis of how frequently the network activities occurred regarding the earlier content distributions that were formulated in the language. Selecting the format can include determining whether at a time when the content distribution is to be made the user is associated with a selection tendency. Performing the analysis can include identifying at least a first time period characterized by the user being associated with the selection tendency regarding selecting the earlier content distributions, and a second time period characterized by the user not being associated with the selection tendency; and wherein selecting the format comprises determining whether the network activities during a most recent predetermined amount of time resemble those of the first time period more than the second time period. The determination can indicate that the user is associated with the selection tendency, and selecting the format can include: selecting multiple content portions to be included in the content distribution, wherein the multiple content portions are configured so that the user can select any of the multiple content portions. Selecting the format can include adding a highlight to a content portion to be included in the content distribution. The method can further include identifying, using the information collection, at least a first geographical region of multiple geographical regions from which content has been distributed to the user, the first geographical region identified as being associated with a higher frequency of selection by the user than others of the multiple geographical regions; selecting content from the first geographical region to be included in the content distribution. The content distribution can involve advertising, and the method can further include identifying an area of a user interface as being devoted to advertisement content and available to display the content distribution to the user; selecting non-advertisement content relating to a topic of the page; and placing the non-advertisement content in the area in the content distribution in lieu of the advertising content. The topic of the page can relate to a product and the non-advertisement content can relate to a review of the product. The advertisement content can be provided by an advertisement distributor and the non-advertisement content can be selected to be provided by a third party entity. The method can further include, in subsequent content distributions to the user, changing a content selection for the area from the non-advertisement content toward advertisement-related content. The method can further include monitoring at least one of the subsequent content distributions to determine whether a user tendency to select content in the area is changing.

In a second aspect, a computer program product is tangibly embodied in a computer-readable storage medium and includes instructions that when executed by a processor perform a method for performing a content distribution associated with a format. The method includes performing analysis of an information collection reflecting network activities by a user, the network activities occurring in response to earlier content distributions to the user. The method includes selecting a format for a content distribution to be made to the user, the format selected based on the analysis. The method includes performing the content distribution to the user with the content having the format.

Implementations can provide any, all or none of the following advantages. Content distribution can be targeted to a user regarding one or more format aspects. More effective targeting of content can be provided. Selection tendencies can be monitored and content distribution can be adapted to a particular tendency.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
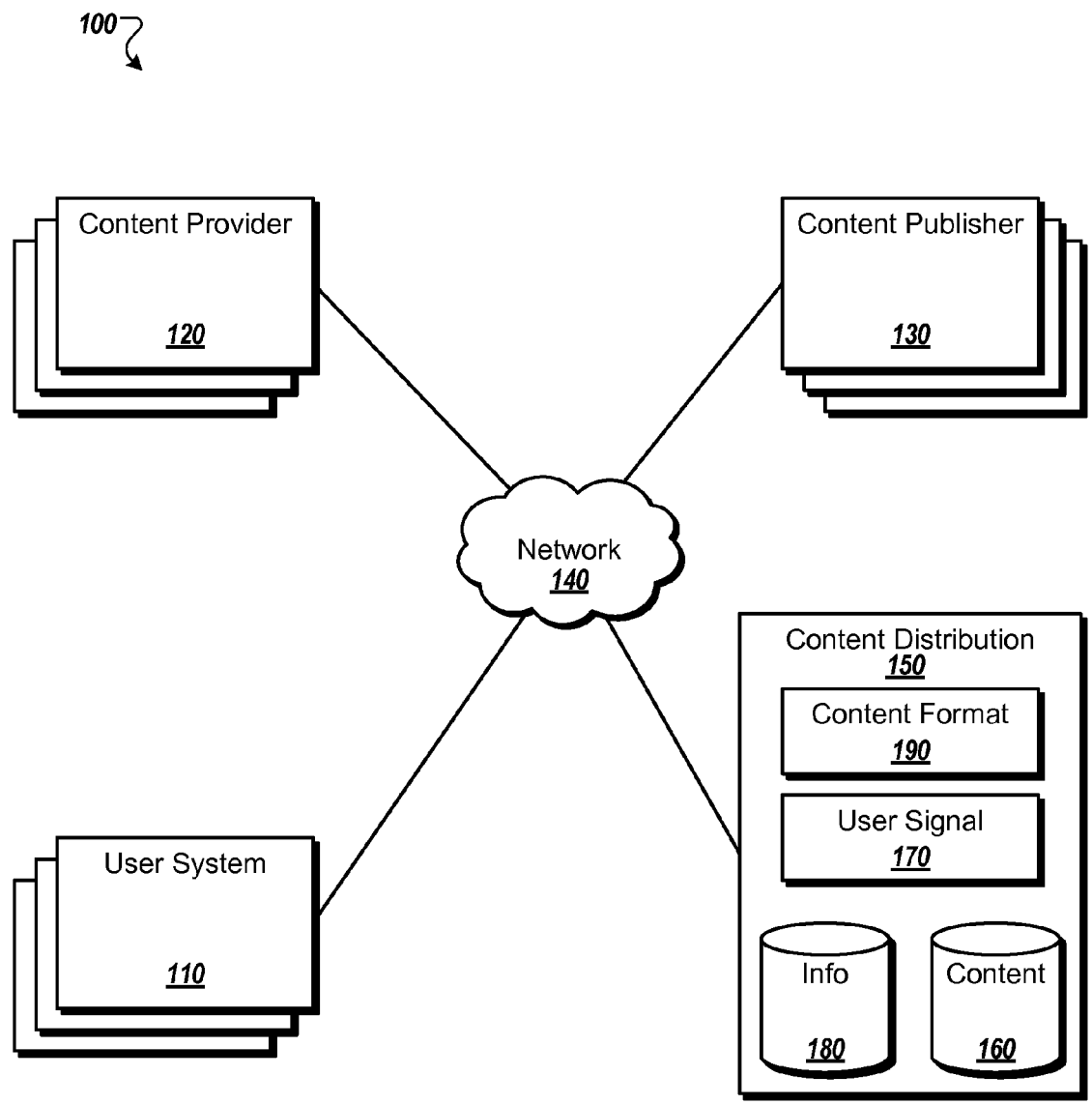
FIG. 1 shows an example system that can perform content distribution.

FIG. 1 is a block diagram of an example system 100 that can be used for content distribution. In some implementations, the system 100 can use information about a user's individual preferences in selecting the format of one or more content items (e.g., advertisements) to be presented to the user. For example, a user can browse a web page from a particular publisher, and the system 100 can operate to select the format of, and present, content such as advertisements in a way that the content may appeal to the user's individual tastes. The format can be selected regarding one or more aspects of the content distribution.

The system 100 here includes user systems 110. In some implementations, the user systems 110 can be personal computers, handheld devices, portable computers, cell phones, audio players, video players, interactive television systems (e.g., set top boxes), video game systems, global positioning devices, and/or other information or entertainment devices. Each user system 110 can be operated by one or more individual users, for example in a home, office or a public location.

The user systems 110 can present content items from one or more content providers. For example, content items can include advertisements for products, goods, and/or services of the content providers. Here, each content provider can operate one or more of multiple content provider systems 120. Content items, such as advertisements, can be presented in association with other published content, such as web pages, that are provided using one or more of multiple content publisher systems 130. In some implementations, the content provider systems 120 and/or the content publisher systems 130 can be one or more kinds of computer devices, such as web servers, video servers, audio servers, e-mail servers, messaging systems, interactive voice response systems, or other systems that can provide content items and/or published content to the user systems 110.

The user systems 110 can communicate over any kind of network 140, such as to request and receive published content from the content provider systems 120 and the content publisher systems 130. In some implementations, the network 140 can be a public network (e.g., the Internet), a private network (e.g., a LAN), a cellular network, a satellite network, or another form of wired or wireless network.

The content provided by the publishers 130 in some implementations can include references to, and/or executable components that retrieve, content items from a content distribution system 150. In some implementations, the user systems 110 can access the content distribution system 150 to determine what content items (e.g., ads) to include in the published content (e.g., web pages, video stream, audio stream). For example, a web browser on one of the user systems 110 can request a web page from one of the content publisher systems 130. The content publisher system 130 can serve the web page, for example including references and/or scripts that can cause the web browser to request one or more advertisements or other content items from the content distribution system 150. In response to such a request, the content distribution system 140 can determine the identity of one or more contents to be included in the displayed web page, and can deliver the identified content to the user systems 110 for presentation in the displayed web page.

The content distribution system 150 can include a collection of content 160. In some implementations, the collection of content 160 can be repository of advertisements (e.g., text, graphics, video, audio) and/or other information that can be stored as one or more items, objects, files and/or database records. One or more individual content portions in the content 160 can be associated with priority information, for example to indicate a user preference between text ads, image ads, one or more formats of video ads, and other ad formats. In some implementations, the collection of content 160 can be accessed by the content distribution system 150 to access content. For example, the content distribution system 150 can retrieve one or more advertisements stored in the collection of content 160, and provide those advertisements to the user systems 110. In some implementations, the collection of content 160 can be flexibly located. In the illustrated example, the collection of content 160 is shown as part of the content distribution system 150, but in other examples the collection of content 160 can be stored in part or whole by the content distribution system 150, one or more of the content provider systems 120, the content publisher systems 130, and/or combinations of the systems 120, 130, 150 and/or other systems that can be used to store content. In some implementations, the collection of content 160 can be stored in part or whole by the user systems 110. For example, a video game disc's unused storage space can be used to store preloaded content, and during game play the video game can access the content distribution system 150 to determine what preloaded content to present to the user.

The content distribution system 150 can includes a user signal component 170. In some implementations, the user signal component 170 can generate and/or identify one or more user signals (e.g., information about the user's activities). For example, such a user signal can be used to infer information to describe the user's preferences and interests. In some implementations, the user's browsing habits can indicate that the user has a tendency to click on, or otherwise select, content such as advertisements that to some extent depends on a format aspect of the content. For example, such a user signal can be received and used to infer that the user has affinities for animated or otherwise highly active content, as opposed to, for example, text advertisements or still images.

The user signal component 170 can access information about one or more users in a collection of information 180. In some implementations, the collection of information 180 can be a repository of data stored as one or more records, files and/or databases. For example, the collection of information 180 can includes categories that describe languages, content formats, ones of the content provider systems 120, and other categories of information. In some implementations, the categories included in the collection of information 180 can be associated with user identities to store indications of the users' affinities and/or aversions to the various categories.

In some implementations, the collection of information 180 can include information that one or more users have provided explicitly. For example, a user can sign up for an account on the content distribution system 150 and/or a system that shares user data with the content distribution system 150. The user can volunteer to provide demographic information, language preferences, content delivery preferences, information about personal and/or professional interests, and/or other information that describes the user's preferences. In some implementations, the collection of information 180 can indicate characteristics to which the user is averse. For example, an individual user's information can indicate that the user dislikes spicy foods, animated ad banners, and/or fur clothing. To protect privacy rights of the users, the content distribution system 150 and/or any other participant in the content distribution can create and enforce one or more privacy policies regarding how information is collected and/or used.

In some implementations, user information stored in the collection of information 180 can be based upon monitoring user network behavior. For example, the user may have a long term history of interacting with various contents, such as advertisements. In some implementations, the user information can indicate short term characteristics by analyzing one or more users' recent actions. For example, the user may have recently interacted with one or more contents in a way that indicates a higher tendency to select content, which in some situations can be referred to as a "clickiness" of the user.

In some implementations, the identity of the user is protected by use of one or more anonymization processes. In some implementations, certain information associated with users is anonymized or partially redacted. For example, the user history and login association, or device history and address association, can be anonymized by use of collision-resistant hashes that hash the identification data. For example, user identities (such as user names or user electronic mail addresses) can be replaced in whole or in part with a numerical string, user Internet Protocol addresses can be processed to eliminate some information such as, for example, the class C and class D subdomain information, user browsing history can be disassociated with a particular user identity and replaced with a user interest category, and user interest categories can be generalized to minimize association with specific user identities or user browsing histories, and the like. Additional privacy protection techniques can also be used, such as the use of one or more encryption processes.

In some implementations, to protect the privacy of users, the user signal component 170 and/or another component in the system 100 anonymizes data for users so that the stored data cannot be associated with the users. For example, each user query can be associated with a unique 128-bit number that is not associated with any user. However, opt-in and/or opt-out procedures can be provided, and if the user opts-in for tracking of user history data, the systems and techniques described herein can associate search queries, clicks and/or other user activities with a user identifier that is uniquely associated with the user. A user can grant permission to the user signal component 170 to track the user's history so that historical data for the user's search sessions and other user data are tracked and associated with the user. For example, at the user's option, a search engine and/or a browser can be configured to track only data approved by the user, such as only search queries and search result selections. The user can clear historical data associated with the user at any time, and can opt-out of such tracking at any time. In another example, an identifier can also anonymously identify a device (e.g., a laptop or a mobile phone) from which the user activity originated. A device identifier can be, for example, a cookie or an Internet Protocol (IP) address.

The system 100 can include a content format component 190 that can be used to select a format for content distribution. In some implementations, the format can be selected based on analyzing one or more information portions in the information 180. For example, the user's network activities in interacting with one or more distributed content portions, such as advertisements, can be analyzed to determine the format aspect(s) most likely to trigger a response from the user. In some implementations, the distributed content can be configured such that the user can respond by clicking on or otherwise selecting the content, by visiting a page or other resource associated with the content provider, and/or by purchasing something from, or otherwise registering with, the content provider.

Other implementations that do not involve users viewing web pages can be used. For example, the user systems 110 can include audio and/or video players, wherein the content publisher systems 130 can provide audio and/or video content, and the content distribution system 150 can use the user's identity to choose format(s) for content items that can be presented along with the audio and/or video content (e.g., ad banners near a video window, commercials inserted in the audio and/or video streams, "crawl lines" overlaid on a video window). In another example, the user systems can be video game consoles that access the content distribution system 150 to obtain content items that can be presented in the consoles' lobby screens or in the games themselves (e.g., billboards in a driving game can present ads for products that the player is predicted to be more likely to buy).

In some implementations, the user systems 110 can include systems with which the user interacts remotely. For example, the user can use a telephone to access an interactive voice response system (e.g., a directory assistance system). The interactive voice response system (IVR) can pass the identity of the user to the content distribution system 150, and request content items that are likely to appeal to the caller. For example, if the user asks for information about nearby restaurants, the content distribution system 150 can choose a recommendation format based on information about the user (e.g., to recommend only one restaurant with a detailed description instead of multiple brief recommendations) and cause the IVR to generate its response to the user accordingly. As another example, audible commercials that align with the user's interests can be selected according to a particular format and presented to the user during the IVR session.

In some implementations, the collection of content 160 can include information that describes the content items. For example, in addition to advertising content, the collection of content 160 can also include information that describes the languages, formats, vertical categories, and/or other information that can describe the content and/or be used to determine prediction values.

A format for a content distribution can be selected based on one or more types of analysis. The analysis can take into account a user's demonstrated tendency to select distributed content based on one or more format aspects of the content.

Any format aspect can be taken into account, such as the language preferred by the user. In some implementations, the content format component 190 can determine a first number of content portions that have been presented in earlier content distributions to the user. For example, the determination can indicate that the numbers are:
  Format A=110 impressions;
  Format B=27 impressions; and
  Format C=59 impressions.

In some implementations, the content format component 190 can determine a second number of events included in the network activities where the user has selected at least one of the content portions. For example, the determination can indicate that the selection numbers are:
  Format A=22 selections;
  Format B=21 selections; and
  Format C=2 selections.

The content format component 190 can use any or all of the above example numbers in selecting the format for the content to be distributed, for example by comparing the number (s) of selection with the number(s) of impressions made to the user. For example, the content format component 190 can identify any earlier content distribution that had a certain format characteristic (e.g., a particular shape and/or location), and the format can be selected based on the analysis of how frequently the network activities occurred regarding the earlier content distributions that had the format characteristic.

A content portion can be stored in a format that permits text to be generated in any of two or more languages. In some implementations, content such as a text advertisement can be originally created in two or more languages, or can be subjected to translation to generate a translated version from an original text. For example, the content format component 190 can identify any earlier content distribution(s) that was formulated in a certain language. A language for the content distribution to be made can be selected based on the analysis of how frequently the network activities occurred regarding the earlier content distributions that were formulated in the language.

User "clickiness" and/or any other selection tendency can be taken into account. In some implementations, user network activity can be analyzed to determine whether the user is presently "clicky" (e.g., the user presently has a detectable tendency to select a relatively high percentage of content being distributed) or if the user is presently "not clicky" (e.g., the user presently has little or no detectable tendency to select distributed content). For example, clicking 30% or more of presented advertisements can be considered clicky, and clicking on less than 1% can be considered not clicky.

In some implementations, analyzing the user network activity can include identifying one or more time periods of user activity and/or inactivity. For example, a first time period can be identified that is characterized by the user being associated with the selection tendency as a result of selecting the content distributed during the first time period to a relatively large degree. As another example, a second time period can be identified that is characterized by the user not being associated with the selection tendency. In some implementations, selecting the format can include determining whether the network activities during a most recent predetermined amount of time (such as during a last few minutes or hours) resemble those of the first time period more than the second time period. Other time frames and/or selectivity criteria can be used. In some implementations, if the user is determined to presently be in a clicky state, more than one content portion such as an advertisement can be presented in response. For example, presenting multiple advertisements at such a time might increase the chance of user response.

Content can be selected based on geographical region. For example, a user may be located in a particular region but may have a tendency to prefer content (e.g., advertisements) that are associated with another region. Such a tendency can be detected, for example, by analyzing the information 180. For example, the content distribution system 150 can analyze the information 180 and select the geographical region whose content a particular user responds to most frequently, to name just one selectivity criterion. The content distribution system 150 can cause the user to be targeted with content from the selected region, for example by selecting advertisements from that region for presentation to the user. In some implementations, such a selection of geographical region can be made in addition to, or in lieu of, using other context information, such as user location or keyword matching, to choose the appropriate geographical region.

Figure 2:
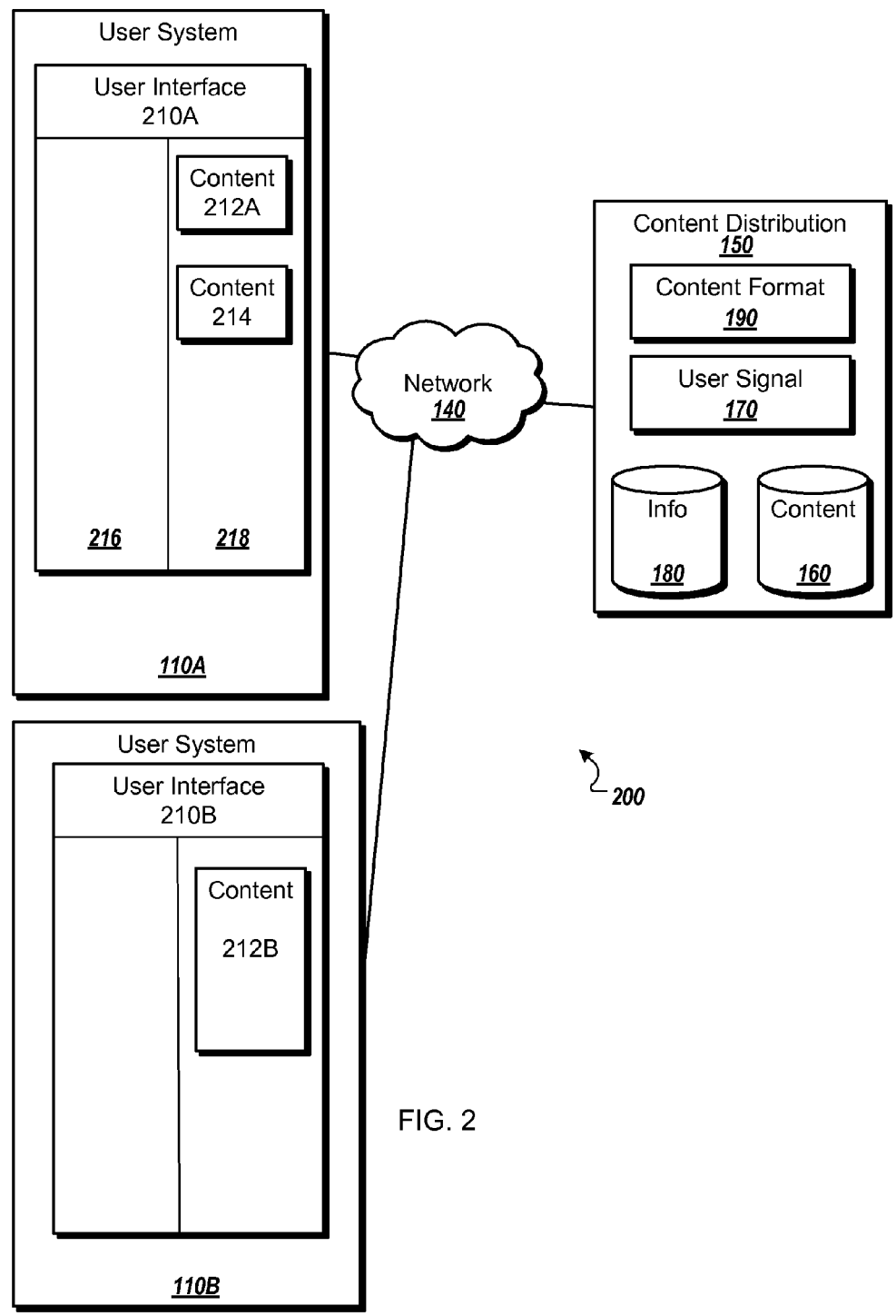
FIG. 2 shows another example system that can perform content distribution.

FIG. 2 shows another example system that can perform content distribution. Here, a system 200 can include the content distribution system 150 connected to the network 140, and can include two or more user systems 110A and 110B. In some implementations, the user systems 110A-B can communicate with the content distribution system 150 and/or with any other component, such as with each other, for example using the network 140. In the present example, the content distribution system 150 will select a format for the content distribution to each of the user systems 110A-B.

The content distribution system 150 can employ one or more user signals in making a format selection, such as, for example, a user signal associated with the respective users operating the user systems 110A-B. In some implementations, the user signal component 170 can be used. For example, the user signal can be derived from user information, such as from the information 180.

In some implementations, the content distribution system 150 can use the content format component 190 to select one or more formats. For example, a format can be selected as most likely to trigger a user response based on analyzing past network activities by the user. The format can be applied to any type of content stored in the content collection 160, such as text content, image content, video content, audio content and/or any other type of content. The content format component 190 can use priority information or any other ranking measure to choose a format. In some implementations, the content format component 190 can take into account one or more preferences among text ads, image ads, one or more formats of video ads, and/or other ad formats. For example, a detected user preference for certain type(s) of ads can be taken into account.

In some implementations, content can be presented in a user interface. Here, for example, the user system 110A can generate a user interface 210A, and the user system 110B can generate a user interface 210B. In some implementations, the user interface 210A and/or 210B can include a browser or any other type of program executable by the respective user system.

Here, the content distribution system 150 selects a first content portion for distribution to each of the user systems 110A-B. In some implementations, the content can be distributed to the respective user systems at different times, such as in response to the respective user navigating to a page that meets a relevance criterion with regard to the first content portion. The content distribution system 150 can select the same or different formats of the first content portion for the respective user systems. Here, for example, the first content portion is presented as content 212A on the user system 110A, and as content 212B on the user system 110B. While the format difference is schematically illustrated as a size difference (i.e., the content 212B is displayed larger than the content 212A), any or all format aspects can be varied. For example, either of the contents 212A and 212B can be presented using a different size (e.g., number of pixels in height and/or width), layout (e.g., organization within a boundary), shape (e.g., rectangular or square), color (i.e., green or red), position (e.g., left/right or top/bottom orientation), frame (e.g., embedded in other content or separately), sound (e.g., with loud, medium or no sound effect), language (e.g., written in a native language of the region where the user's device is located or in another language), and/or highlight (e.g., blinking, extra large and/or animation) than the other one of the contents 212A and 212B.

In some implementations, more than one content portion can be selected and distributed to a user. For example, the content distribution system 150 can select and forward a second content portion 214 to at least the user system 110A. In some implementations, the second content portion 214 can be chosen in response to the content distribution system 150 determining that a user operating the user system 110A currently has a selection tendency. Accordingly, in such an example, the user may be presented with more content (e.g., advertisements) than otherwise. As another example, when the user has a clicky tendency, a highlight may be added to the user interface 210 so as to emphasize a portion of the content and/or a link that presents one or more additional content portions (e.g., a "Show more ads" link can be highlighted).

Handling of content can vary over time. In some implementations, the user interface 210 can include separate areas 216 and 218. For example, the area 216 can be used mainly for content that is the subject of a page or other resource displayed in the user interface, such as the web page from a particular publisher. As another example, the area 218 can be used mainly for content distributed from the content distribution system 150, such as advertisements. In some implementations, on an occasion when the page is to be presented to a specific user, the area 216 can include substantive content (e.g., from a manufacturer's web page about a product the user is interested in), and the area 218 can be provided with non-advertisement content regarding the product described in the substantive content, such as a product review provided by a third party. For example, the added relevance of the product review to the main content of the page (e.g., the manufacturer's product description) can give the user added incentive to view the area 218 and/or to select its content. In some implementations, this approach can be used to combat what can be conceptually be considered a user "blindness" regarding content in the area 218. At a later time, other content can be placed in the area 218, such as gradually over a period of time (e.g., in a sequence of individual presentation sessions). In some implementations, content more related to advertising can later be placed in the area 218. For example, advertisements regarding the product at issue can be introduced in the area 218, and later advertisements for related products/services, such as advertisements targeted to the user, can begin to appear. Other approaches can be used. In some implementations, the content distribution system 150 can monitor user responses, such as any responses to content in the area 218. For example, the monitoring can be used in determining whether the user exhibits a higher tendency to select content in the area 218 over time.

Figure 3:
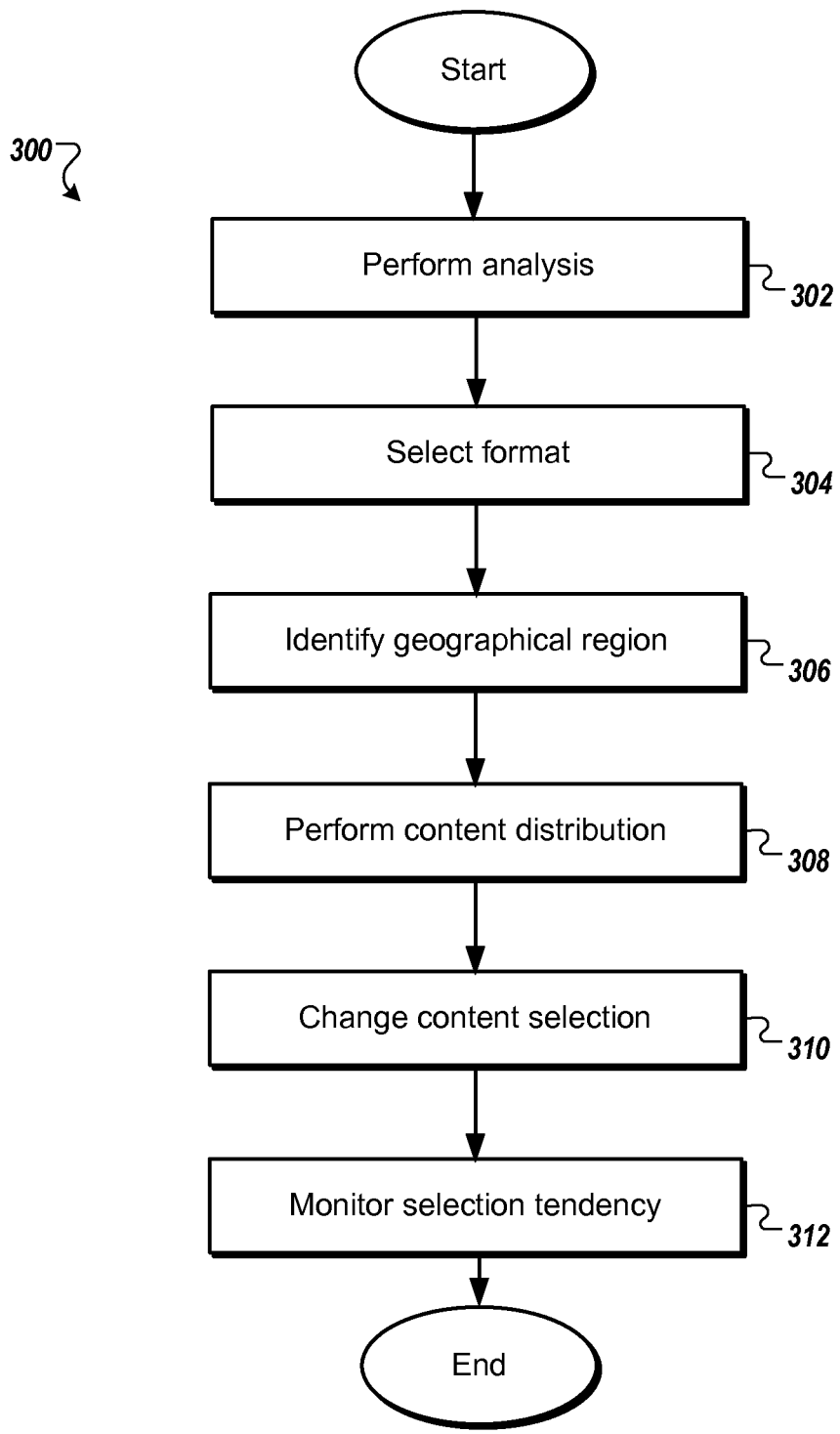
FIG. 3 shows a flowchart of an example method that can be executed to perform content distribution.

FIG. 3 shows a flowchart of an example method 300 that can be executed to perform content distribution. The method 300 can be performed by a processor executing instructions in a computer-readable storage medium. One or more steps can be performed in another order; and, as another example, more or fewer steps can be performed.

In step 302, an analysis can be performed of an information collection reflecting network activities by a user. The network activities can have occurred in response to earlier content distributions to the user. For example, the content distribution system 150 can employ the user signal component 170 to analyze user activities reflected by the information 180.

In step 304, a format can be selected for a content distribution to be made to the user. The format can be selected based on the analysis. For example, the content format component 190 can select one or more format aspects for the contents 212A-B and/or 214 based on the information 180.

In step 306, a geographical region can be identified. For example, the content distribution system 150 can identify that the user system 110A is physically located in a first region and that the user operating the system is most likely to respond to content distributions regarding a second region.

In step 308, the content distribution can be performed to the user with the content having the format. For example, any or all of the contents 212A-B and/or 214 can be distributed by the content distribution system 150.

In step 310, a content distribution can be changed. For example, the content 212A or 212B in the area 218 may initially have been non-advertising content and can be changed to be more advertisement-related content.

In step 312, a selection tendency can be monitored. For example, the content selection system 150 can monitor whether a user operating the user system 110A and/or 110B develops an increased tendency to select content in the area 218.

Figure 4:
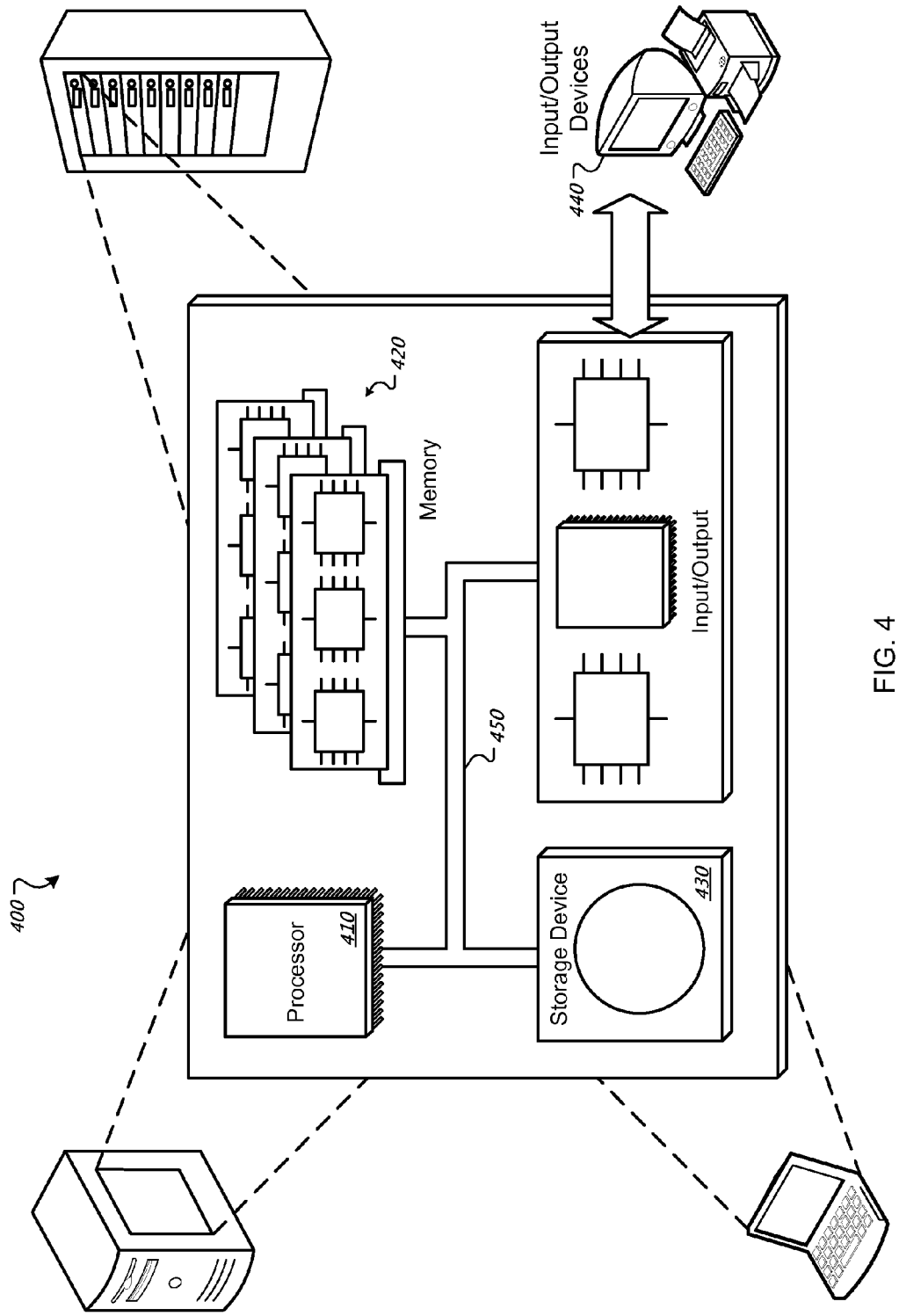
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method comprising:
performing, using a computer device, analysis of an information collection reflecting network activities by an individual user, the network activities occurring in response to earlier content distributions, wherein a given content distribution includes distribution of content formatted in accordance with one or more of multiple formats in a configurable content area that presents particular content to the individual user, wherein the analysis includes:
   determining a number of impressions of content to the individual user that occurred for each different format of the plurality of formats;
   determining a number of events that occurred subsequent to each determined impression including determining a number of selections of a content item that was of a particular format of the plurality of formats; and
   comparing the number of selections with the number of impressions to the user per format to determine how frequently network activities occurred regarding earlier content distributions that had a particular format characteristic, wherein the information collection reflecting the network activities by the individual user includes information for each of the multiple formats including information describing numbers of impressions in the information collection, format of content distributed in a given instance and network activities by the individual user associated with the given instance including selections after an impression, the multiple format types selected from the group comprising size, layout, shape, color, position, frame, sound, language and highlight;
selecting, using the computer device and for a subsequent content distribution to be made to the user, at least one of the multiple formats based at least in part on the analysis;
determining, based on performing the analysis, whether the individual user is more likely or less likely at a particular time corresponding to a time of the content distribution to select the configurable content area;
selecting, based on the selection of the at least one format, particular content for inclusion in the configurable content area that was not included in the earlier content distributions to the individual user, wherein the particular content to be presented in the configurable content area is revenue-generating content when the individual user is more likely to select the configurable content area and the particular content is non-revenue generating content when the individual user is less likely to select the configurable content area; and
providing a document that is responsive to a request, the document including the selected particular content and having the selected at least one format.

2. The computer-implemented method of claim 1, wherein performing the analysis further comprises:
determining a frequency with which the network activities occurred regarding content portions having the format characteristic of being associated with a specific color.

3. The computer-implemented method of claim 1, wherein performing the analysis further comprises:
determining a frequency with which the network activities occurred regarding content portions having the format characteristic of being associated with a specific size.

4. The computer-implemented method of claim 1, wherein performing the analysis further comprises:
   determining a frequency with which the network activities occurred regarding content portions having the format characteristic of being associated with a specific layout.

5. The computer-implemented method of claim 1, wherein performing the analysis further comprises:
   determining a frequency with which the network activities occurred regarding content portions having the format characteristic of being associated with a specific shape.

6. The computer-implemented method of claim 1, wherein performing the analysis further comprises:
   determining a frequency with which the network activities occurred regarding content portions having the format characteristic of being associated with a specific placement on a user interface visible to the individual user.

7. The computer-implemented method of claim 1, wherein performing the analysis comprises:
   identifying any of the earlier content distributions that was formulated in a certain language, wherein a language for the content distribution is selected based on the analysis of how frequently the network activities occurred regarding the earlier content distributions that were formulated in the language.

8. The computer-implemented method of claim 1, wherein selecting the format comprises:
   determining whether at a time when the content distribution is to be made the individual user is associated with a selection tendency.

9. The computer-implemented method of claim 8, wherein performing the analysis comprises:
   identifying at least a first time period characterized by the individual user being associated with the selection tendency regarding selecting the earlier content distributions, and a second time period characterized by the individual user not being associated with the selection tendency; and
   wherein selecting the format comprises determining whether the network activities during a most recent predetermined amount of time resemble those of the first time period more than the second time period.

10. The computer-implemented method of claim 8, wherein the determination indicates that the individual user is associated with the selection tendency, and wherein selecting the format comprises:
    selecting multiple content portions to be included in the content distribution, wherein the multiple content portions are configured so that the individual user can select any of the multiple content portions.

11. The computer-implemented method of claim 1, wherein selecting the format comprises:
    adding a highlight to a content portion to be included in the content distribution.

12. The computer-implemented method of claim 1, further comprising:
    identifying, using the information collection, at least a first geographical region of multiple geographical regions from which content has been distributed to the individual user, the first geographical region identified as being associated with a higher frequency of selection by the individual user than others of the multiple geographical regions;
    selecting content from the first geographical region to be included in the content distribution.

13. The computer-implemented method of claim 1, wherein the content distribution involves advertising, the method further comprising:
    identifying an area of a user interface as being devoted to advertisement content and available to display the content distribution to the individual user;
    selecting non-advertisement content relating to a topic of the page; and
    placing the non-advertisement content in the area in the content distribution in lieu of the advertising content.

14. The computer-implemented method of claim 13, wherein the topic of the page relates to a product and the non-advertisement content relates to a review of the product.

15. The computer-implemented method of claim 13, wherein the advertisement content is provided by an advertisement distributor and wherein the non-advertisement content is selected to be provided by a third party entity.

16. The computer-implemented method of claim 13, further comprising:
    in subsequent content distributions to the individual user, changing a content selection for the area from the non-advertisement content toward advertisement-related content.

17. The computer-implemented method of claim 16, further comprising:
    monitoring at least one of the subsequent content distributions to determine whether a user tendency to select content in the area is changing.

18. The computer-implemented method of claim 1, wherein the selection of format takes into account a predetermined user preference among at least two content formats.

19. A computer program product tangibly embodied in a computer-readable storage device and comprising instructions that when executed by a processor perform a method comprising:
    performing, using a computer device, analysis of an information collection reflecting network activities by an individual user, the network activities occurring in response to earlier content distributions, wherein a given content distribution includes distribution of content formatted in accordance with one or more of multiple formats in a configurable content area that presents particular content to the individual user, wherein the analysis includes:
        determining a number of impressions of content to the individual user that occurred for each different format of the plurality of formats;
        determining a number of events that occurred subsequent to each determined impression including determining a number of selections of a content item that was of a particular format of the plurality of formats; and
        comparing the number of selections with the number of impressions to the user per format to determine how frequently network activities occurred regarding earlier content distributions that had a particular format characteristic, wherein the information collection reflecting the network activities by the individual user includes information for each of the multiple formats including information describing numbers of impressions in the information collection, format of content distributed in a given instance and network activities by the individual user associated with the given instance including selections after an impression, the multiple format types selected from the group comprising size, layout, shape, color, position, frame, sound, language and highlight;

selecting, using the computer device and for a subsequent content distribution to be made to the user, at least one of the multiple formats based at least in part on the analysis;

determining, based on performing the analysis, whether the individual user is more likely or less likely at a particular time corresponding to a time of the content distribution to select the configurable content area;

selecting, based on the selection of the at least one format, particular content for inclusion in the configurable content area that was not included in the earlier content distributions to the individual user, wherein the particular content to be presented in the configurable content area is revenue-generating content when the individual user is more likely to select the configurable content area and the particular content is non-revenue generating content when the individual user is less likely to select the configurable content area; and providing a document that is responsive to a request, the document including the selected particular content and having the selected at least one format.

* * * * *